(12) United States Patent
Nakazawa et al.

(10) Patent No.: US 12,024,276 B2
(45) Date of Patent: Jul. 2, 2024

(54) CONTROL DEVICE AND CONTROL METHOD FOR CONTROLLING FLIGHT OF AERIAL VEHICLE

(71) Applicant: Rakuten Group, Inc., Tokyo (JP)

(72) Inventors: Mitsuru Nakazawa, Tokyo (JP); Jun Takizawa, Chino (TW)

(73) Assignee: Rakuten Group, Inc., Tokyo (JP)

( * ) Notice: Subject to any disclaimer, the term of this patent is extended or adjusted under 35 U.S.C. 154(b) by 617 days.

(21) Appl. No.: 16/973,153

(22) PCT Filed: Nov. 5, 2019

(86) PCT No.: PCT/JP2019/043218
§ 371 (c)(1),
(2) Date: Dec. 8, 2020

(87) PCT Pub. No.: WO2021/090352
PCT Pub. Date: May 14, 2021

(65) Prior Publication Data
US 2021/0362839 A1 Nov. 25, 2021

(51) Int. Cl.
*B64C 13/18* (2006.01)
*B64C 39/02* (2023.01)
*B64D 47/08* (2006.01)
*G05D 1/00* (2024.01)

(52) U.S. Cl.
CPC ............ *B64C 13/18* (2013.01); *B64C 39/024* (2013.01); *B64D 47/08* (2013.01); *G05D 1/0816* (2013.01); *G05D 1/0858* (2013.01); *G05D 1/102* (2013.01); *B64U 2201/10* (2023.01)

(58) Field of Classification Search
CPC ....... B64C 13/18; B64C 39/024; B64D 47/08; G05D 1/0816; G05D 1/0858; G05D 1/102; B64U 2201/10
See application file for complete search history.

(56) References Cited

U.S. PATENT DOCUMENTS

| | | | |
|---|---|---|---|
| 2006/0060694 A1* | 3/2006 | Nonami | A63H 30/04 701/11 |
| 2018/0024571 A1* | 1/2018 | Peasgood | B64C 29/0033 244/7 C |
| 2018/0281950 A1* | 10/2018 | Aruga | B64C 39/024 |
| 2020/0322595 A1* | 10/2020 | Abe | H04N 13/383 |

FOREIGN PATENT DOCUMENTS

| | | |
|---|---|---|
| JP | 2004-345435 A | 12/2004 |
| JP | 2021-18638 A | 2/2021 |

* cited by examiner

*Primary Examiner* — Jess Whittington
*Assistant Examiner* — Terry C Buse
(74) *Attorney, Agent, or Firm* — Sughrue Mion, PLLC (57) ABSTRACT

A first attitude estimation unit 16 estimates an attitude of an UAV 1 by performing a Visual-SLAM on the basis of detection values detected by an imaging unit 14, and a second attitude estimation unit 17 estimates an attitude of the UAV 1 on the basis of detection values detected by a rotation angle detection unit 15. And then a control unit 18 controls the attitude of the UAV 1 by utilizing a first attitude estimation result from the first attitude estimation unit 16 and a second attitude estimation result from the second attitude estimation unit 17 at a ratio based on positional information of the UAV 1.

5 Claims, 5 Drawing Sheets

CONTROL DEVICE AND CONTROL METHOD FOR CONTROLLING FLIGHT OF AERIAL VEHICLE

CROSS REFERENCE TO RELATED APPLICATIONS

This application is a National Stage of International Application No. PCT/JP2019/043218 filed Nov. 5, 2019.

TECHNICAL FIELD

The present invention relates to a technical field of a control method and the like executed by a system that controls flight of an aerial vehicle.

BACKGROUND ART

Conventionally, a geomagnetic sensor and an inertial sensor (e.g., an acceleration sensor or an angular velocity sensor) have been used in many devices such as a mobile phone, a car navigation system, and an aerial vehicle in order to estimate an attitude of each thereof. For example, Patent Literature 1 discloses a technology that measures an attitude of a flying object with high accuracy by correcting azimuth information measured by a triaxial gyro device (an angular velocity sensor) with azimuth information measured by a geomagnetic sensor.

CITATION LIST

Patent Literature

Patent Literature 1: JP 2004-345435 A

SUMMARY OF INVENTION

Technical Problem

However, there is a case where a detection value (a measured value) detected by a geomagnetic sensor or an inertial sensor is not reliable. For example, in a case where there is an object that generates a strong magnetic field or an electric field in the vicinity, there is a case where the geomagnetic sensor or the inertial sensor outputs an abnormal value and cannot correctly estimate an attitude of an aerial vehicle. As a result, there may be a possibility that flight of the aerial vehicle becomes unstable.

Therefore, one or more embodiments of the present invention are directed to provide a control device and a control method that are capable of making an aerial vehicle stably fly even in a case where a detection value detected by the geomagnetic sensor or the inertial sensor is not reliable.

Solution to Problem

In response to the above issue, the invention according to claim 1 is a control device that controls flight of an aerial vehicle including an optical sensor and at least one type of a triaxial sensor. The control device includes: a first acquisition unit configured to acquire a first detection value detected by the optical sensor; a second acquisition unit configured to acquire a second detection value detected by the triaxial sensor; a third acquisition unit configured to acquire positional information indicating a flight position of the aerial vehicle; a first attitude estimation unit configured to estimate an attitude of the aerial vehicle on the basis of the first detection value; a second attitude estimation unit configured to estimate an attitude of the aerial vehicle on the basis of the second detection value; and a flight control unit configured to control flight of the aerial vehicle by utilizing a result of the attitude estimation by the first attitude estimation unit and a result of the attitude estimation by the second attitude estimation unit at a ratio based on the positional information. Thus, even in a case where a detection value detected by a geomagnetic sensor or an inertial sensor is not reliable, the aerial vehicle can be made to fly stably.

The invention according to claim 2 is the control device according to claim 1, wherein the positional information includes altitude information indicating an altitude of the aerial vehicle, and the flight control unit utilizes the result of the attitude estimation by the first attitude estimation unit and the result of the attitude estimation by the second attitude estimation unit at a ratio based on the altitude information. This makes it possible to utilize the result of the attitude estimation by the first attitude estimation unit and the result of the attitude estimation by the second attitude estimation unit at the ratio that is changed in accordance with the flight altitude of the aerial vehicle.

The invention according to claim 3 is the control device according to claim 2, wherein the flight control unit utilizes at least the result of the attitude estimation by the first attitude estimation unit until the aerial vehicle reaches a predetermined altitude after taking off, and the flight control unit utilizes the result of the attitude estimation by the second attitude estimation unit after the aerial vehicle has reached the predetermined altitude. This makes it possible to switch to flight control having a small load from an early stage in which the result of the attitude estimation by the second attitude estimation unit is expected to be a reliable level.

The invention according to claim 4 is the control device according to claim 1, further comprising a distance calculation unit configured to calculate a distance from a takeoff point of the aerial vehicle on the basis of the positional information, wherein the flight control unit utilizes the result of the attitude estimation by the first attitude estimation unit and the result of the attitude estimation by the second attitude estimation unit at a ratio based on the distance. This makes it possible to utilize the result of the attitude estimation by the first attitude estimation unit and the result of the attitude estimation by the second attitude estimation unit at the ratio that is changed in accordance with the distance from the takeoff point of the aerial vehicle.

The invention according to claim 5 is the control device according to claim 4, wherein the flight control unit utilizes at least the result of the attitude estimation by the first attitude estimation unit until the aerial vehicle reaches a predetermined distance after taking off, and the flight control unit utilizes the result of the attitude estimation by the second attitude estimation unit after the aerial vehicle has reached the predetermined distance. This makes it possible to switch to flight control having a small load from an early stage in which the result of the attitude estimation by the second attitude estimation unit is expected to be a reliable level.

The invention according to claim 6 is the control device according to any one of claims 1, 2, and 4, wherein the flight control unit utilizes at least the result of the attitude estimation by the first attitude estimation unit in a case where a deviation amount between the result of the attitude estimation by the first attitude estimation unit and the result of the attitude estimation by the second attitude estimation unit is a threshold value or more, and the flight control unit utilizes the result of the attitude estimation by the second attitude estimation unit in a case where the deviation amount is less than the threshold value. This makes it possible to switch to the flight control having a small load from the early stage in which the deviation amount between the result of the attitude estimation by the first attitude estimation unit and the result of the attitude estimation by the second attitude estimation unit is reduced to a certain level.

The invention according to claim 7 is the control device according to any one of claims 1, 2, and 4, wherein the triaxial sensor includes a geomagnetic sensor, further provided is a calibration unit configured to calibrate a reference azimuth to a true value before takeoff of the aerial vehicle, and the flight control unit utilizes at least the result of the attitude estimation by the first attitude estimation unit in a case where a deviation amount between the true value and the value indicating the reference azimuth detected by the geomagnetic sensor is a threshold value or more, and the flight control unit utilizes the result of the attitude estimation by the second attitude estimation unit in a case where the deviation amount is less than the threshold value. This makes it possible to switch to the flight control having a small load from the early stage in which the deviation amount between the true value and the value indicating the reference azimuth is reduced to a certain level.

The invention according to claim 8 is the control device according to any one of claims 1 to 7, wherein the flight control unit utilizes the result of the attitude estimation by the first attitude estimation unit when the aerial vehicle is located inside a predetermined area, and the flight control unit utilizes the result of the attitude estimation by the second attitude estimation unit when the aerial vehicle is located outside the predetermined area. This makes it possible to utilize the result of the attitude estimation by the first attitude estimation unit and the result of the attitude estimation by the second attitude estimation unit in a switching manner in accordance with whether or not an aerial vehicle has entered the predetermined area during flight of the aerial vehicle.

The invention according to claim 9 is the control device according to any one of claims 1 to 8, further including a power supply control unit configured to control power supply to the optical sensor on the basis of the positional information. This makes it possible to suppress power consumption in the aerial vehicle.

The invention according to claim 10 is the control method executed by a system that controls flight of an aerial vehicle including an optical sensor and at least one type of a triaxial sensor. The control method includes: a step of acquiring a first detection value detected by the optical sensor; a step of acquiring a second detection value detected by the triaxial sensor; a step of acquiring positional information indicating a flight position of the aerial vehicle; a step of estimating an attitude of the aerial vehicle on the basis of the first detection value; a step of estimating the attitude of the aerial vehicle on the basis of the second detection value; and a step of controlling flight of the aerial vehicle by utilizing a result of the attitude estimation by the first attitude estimation unit and a result of the attitude estimation by the second attitude estimation unit at a ratio based on the positional information.

Advantageous Effect of the Invention

According to one or more embodiments of the present invention, it is possible to make an aerial vehicle stably fly even in a case where a detection value detected by the geomagnetic sensor or the inertial sensor is not reliable.

DESCRIPTION OF EMBODIMENTS

Hereinafter, an embodiment of the present invention will be described with reference to the drawings.

Incidentally, the embodiment described below is an embodiment of a case where a present invention is applied to a flight system.

[1. Configuration and Outline of Operation of Flight System S]

Figure 1:
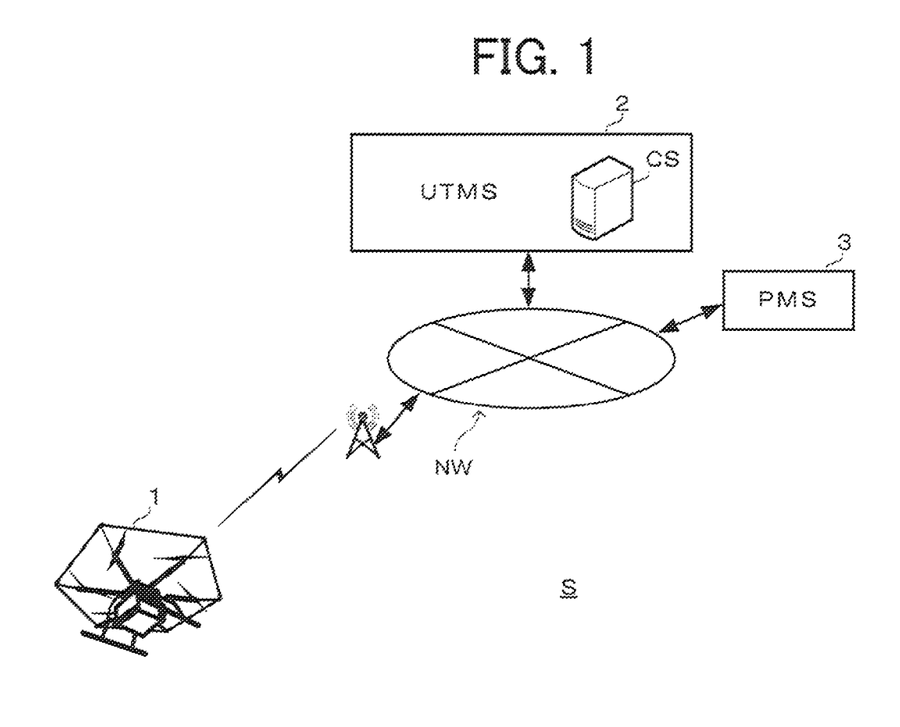
FIG. 1 is a diagram illustrating a schematic configuration example of a flight system S.

First, referring to FIG. 1, a description will be provided for a configuration and an outline of operation of a flight system S by which an aerial vehicle capable of flying unmanned is made to fly for a predetermined purpose. Examples of the predetermined purpose can include carrying (transportation), surveying, image capturing, inspection, monitoring, and the like. FIG. 1 is a diagram illustrating a schematic configuration example of the flight system S. As illustrated in FIG. 1, the flight system S includes: an unmanned aerial vehicle (hereinafter referred to as an "UAV (Unmanned Aerial Vehicle)") 1 that flies in atmosphere (in air); a traffic management system (hereinafter referred to as a "UTMS (UAV Traffic Management System)") 2; and a port management system (hereinafter referred to as a "PMS (Port Management System)") 3. The UAV 1, the UTMS 2, and the PMS 3 can communicate with one another via a communication network NW. The communication network NW includes, for example, the Internet, a mobile communication network, a radio base station thereof, and the like. Incidentally, although one UAV 1 is shown in the example of FIG. 1, there may be a plurality of UAVs 1. The UTMS 2 and the PMS 3 may be configured as one management system.

The UAV 1 can fly in accordance with remote operation from the ground by an operator or can fly autonomously. The UAV 1 is also called a drone or a multi-copter. The UAV 1 is managed by a GCS (Ground Control Station). For example, the GCS is installed as an application in a control terminal that can be connected to the communication network NW. In this case, the operator is, for example, a person who operates the control terminal to remotely control the UAV 1. Alternatively, the GCS may be configured by a server or the like. In this case, the operator is, for example, a manager in the GCS or a controller provided in the server. Incidentally, the autonomous flight of the UAV 1 is not limited to the autonomous flight performed under the flight control of the UAV 1, and the autonomous flight of the UAV 1 also includes autonomous flight performed by the flight control as the entire flight system S, for example.

The UTMS 2 includes one or more servers including a control server CS. The control server CS is an example of the control device. The UTMS 2 manages traffic and flight of the UAV 1. The traffic management of the UAV 1 includes management of a traffic plan of the UAV 1; management of a flight status of the UAV 1, and control of the UAV 1. The traffic plan of the UAV 1 is a flight plan including, for example, a flight route (scheduled route) from a departure point (flight start point) to a destination point for the UAV 1. The flight route is represented by, for example, latitude and longitude on the route, and may include flight altitude. The management and control of the flight status of the UAV 1 is performed on the basis of aircraft information of the UAV 1. The aircraft information of the UAV 1 includes at least positional information of the UAV 1. The positional information of the UAV 1 indicates the current position of the UAV 1. The current position of the UAV 1 is a flight position of the UAV 1 in flight. The aircraft information of the UAV 1 may include speed information of the UAV 1. The speed information indicates a flight speed of the UAV 1.

The PMS 3 includes one or a plurality of servers and the like. The PMS 3 manages, for example, a takeoff and landing facility (hereinafter referred to as a "port") installed at the departure point (takeoff point) and the destination point (or waypoint) of the UAV 1. Incidentally, the port is installed, for example, on a ground surface (the ground), a rooftop of a building, or the like. In the vicinity of such the port, there is a case of having a specific object (hereinafter referred to as a "specific object") that generates a strong magnetic field, an electric field, or an electromagnetic field (hereinafter referred to as a "magnetic field or the like"). Examples of the specific object include a permanent magnet, a transformer, a generator, and the like, and positions thereof are identified in advance. Moreover, in a place other than the vicinity of the ground surface where the port is installed, there may also be specific objects that generate a strong magnetic field or the like (for example, a power transmission line, a radio wave tower, a building of a base station or the like, etc.). The port is managed on the basis of port positional information, port reservation information, and the like. Here, the port positional information indicates an installation position of the port. The port reservation information includes: an aircraft ID of the UAV 1 that has reserved the port; information on scheduled arrival time; and the like. The aircraft ID of the UAV 1 is identification information to identify the UAV 1. Incidentally, in a case where there is the specific object in the vicinity of the port, positional information of the specific object may be managed by the PMS 3 together with positional information of the port.

[2. Configuration and Outline of Functions of UAV 1]

Figure 2:
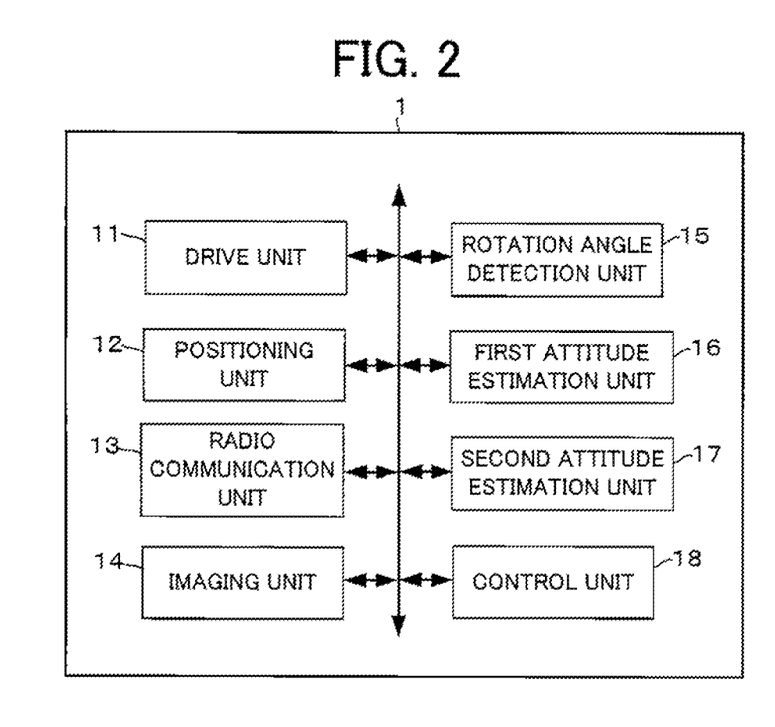
FIG. 2 is a diagram illustrating a schematic configuration example of an UAV 1.

Next, a configuration and an outline of functions of the UAV 1 will be described with reference to FIG. 2. FIG. 2 is a diagram illustrating a schematic configuration example of an UAV 1. As illustrated in FIG. 2, the UAV 1 includes a drive unit 11, a positioning unit 12, a radio communication unit 13, an imaging unit 14, a rotation angle detection unit 15, a first attitude estimation unit 16, a second attitude estimation unit 17, a control unit 18, and the like. Here, the first attitude estimation unit 16 also functions as a first acquisition unit, and the second attitude estimation unit 17 also functions as a second acquisition unit. One attitude estimation unit (including one processor or the like, for example) may function as both the first attitude estimation unit and the second attitude estimation unit. The control unit 18 is an example of a control device, a third acquisition unit, a flight control unit, a power supply control unit, a calibration unit, and a distance calculation unit. Incidentally, although not illustrated, the UAV 1 includes a rotor (propeller) that is a horizontal rotary blade, a battery that supplies power to each of the units of the UAV 1, and the like.

The drive unit 11 includes a motor, a rotating shaft, and the like. The drive unit 11 rotates the rotors with the motor, the rotating shaft, and the like that are driven in accordance with a control signal output from the control unit 18. The positioning unit 12 includes a radio wave receiver, an altitude sensor, and the like. For example, the positioning unit 12 receives, by the radio wave receiver, a radio wave sent from a satellite of a GNSS (Global Navigation Satellite System) and detects a current position (latitude and longitude) in a horizontal direction of the UAV 1 on the basis of the radio wave. The current position of UAV 1 is the flight position of UAV 1 in flight. Incidentally, the current position in the horizontal direction of the UAV 1 may be corrected on the basis of an image captured by the imaging unit 14 or a radio wave sent from the radio base station. The positional information indicating the current position detected by the positioning unit 12 is output to the control unit 18. Further, the positioning unit 12 may detect a current position in a vertical direction (an altitude) of the UAV 1 with the altitude sensor such as a barometric sensor. In this case, positional information includes altitude information indicating the altitude of the UAV 1. The positional information including the altitude information is represented by three-dimensional position coordinates (X, Y, Z) in a world coordinate system. Incidentally, the altitude of the UAV 1 may also be detected on the basis of radio waves received from a satellite of a GNSS. In this case, the altitude detected on the basis of the radio waves received from the satellite of the GNSS may also be used to supplement the altitude detected by the altitude sensor.

The radio communication unit 13 controls communication performed via the communication network NW. The imaging unit 14 includes a camera and the like. The camera is an example of an optical sensor. The camera continuously captures images of a subject in real space within a range fitted in an angle of view (that is, detects light reflected or emitted from the subject), and outputs detection values (exemplary first detection values) each representing an image (a pixel group) to the first attitude estimation unit 16. The detection values output to the first attitude estimation unit 16 are used to estimate an attitude of the UAV 1. Here, the attitude of the UAV 1 indicates, for example, how far the UAV 1 is rotated from a state in which: the UAV 1 is set horizontal to the ground; and a reference azimuth of the UAV 1 is set to, for example, the north (in other words, how the UAV 1 has been rotated to be thus oriented). The rotation is represented by, for example, a rotation angle (a roll angle) around an X-axis, a rotation angle (a pitch angle) around a Y-axis, and a rotation angle (yaw angle) around a Z-axis (vertical direction) (that is, represented by an Euler angle). Alternatively, the rotation may also be represented by a rotation matrix around the X-axis, a rotation matrix around the Y-axis, and a rotation matrix around the Z-axis. Desirably, the rotation is represented by a quaternion (three rotation axes (vectors) and one rotation angle (scalar)) in which so-called gimbal lock is not caused and interpolation is easily performed. Specifically, a quaternion can be represented by a formula "ix+jy+kz+w". Here, signs i, j, and k are imaginary units, respectively. Therefore, signs x, y, and z are imaginary parts, and a sign w is a real part. Moreover, the sign x is an X-axis value, the sign y is a Y-axis value, and the sign z is a Z-axis value. An Euler angle, rotation matrices, and a quaternion are mutually convertible as known. The camera is installed in the UAV 1 so as to cover a horizontal direction although a visual field direction of the camera is little. Desirably, the camera is a camera including a wide-angle lens (such as an omnidirectional camera). Moreover, desirably, the camera is an RGB camera but may be also an infrared camera. Incidentally, an optical sensor (such as a distance sensor, a laser sensor, or a LiDAR (Light Detection And Ranging or Laser Imaging Detection And Ranging)) other than above cameras may also be provided in the UAV 1 in order to estimate an attitude of the UAV 1.

The rotation angle detection unit 15 includes at least one type of a triaxial sensor. Examples of the triaxial sensor include a triaxial angular velocity sensor (also referred to as a gyro sensor), a triaxial acceleration sensor, and a triaxial geomagnetic sensor (also referred to as a magnetic sensor or an azimuth sensor). Each of the triaxial angular velocity sensor and the triaxial acceleration sensor is also referred to as an inertial sensor. The triaxial angular velocity sensor includes, for example, a piezoelectric element and the like, continuously detects angular velocities around the X-axis (a rotation angle per unit time), angular velocities around the Y-axis, and angular velocities around the Z-axis respectively, and outputs detection values (exemplary second detection values) representing the respective angular velocities to the second attitude estimation unit 17. The triaxial acceleration sensor includes, for example, a piezoelectric element and the like, continuously detects gravitational acceleration rates, and outputs detection values (exemplary second detection values) each representing a gravitational acceleration rate with a three-dimensional vector to the second attitude estimation unit 17. The triaxial geomagnetic sensor includes, for example, an electronic compass and the like, continuously detects geomagnetism and outputs, to the second attitude estimation unit 17, detection values (exemplary second detection values) each representing the north (magnetic north) with a three-dimensional vector. Incidentally, the two types of triaxial sensors (e.g., the triaxial angular velocity sensor and the triaxial acceleration sensor) are also collectively referred to as six-axial sensors. Moreover, the three types of the triaxial sensors (i.e., the triaxial angular velocity sensor, the triaxial acceleration sensor, and the triaxial geomagnetic sensor) are also collectively referred to as nine-axial sensors.

The first attitude estimation unit 16 includes a CPU (Central Processing Unit) which is a processor, a ROM (Read Only Memory), a RAM (Random Access Memory), a non-volatile memory, and the like. The first attitude estimation unit 16 continuously acquires detection values from the imaging unit 14, and estimates an attitude of the UAV 1 (an attitude in the world coordinate system) by performing visual simultaneous localization and mapping (SLAM) on the basis of the detection values (images). For example, the first attitude estimation unit 16 traces each of a plurality of characteristic points in a plurality of images (frames), calculates a three-dimensional direction vector from a relative position of the UAV 1 (camera) to each of the characteristic points, and estimates the attitude of the UAV 1 by mapping (for example, by generating a depth map), in which the plurality of images includes: images captured while the UAV 1 is located on the ground (for example, placed on the ground and has the reference azimuth set to, for example, the north); and the images continuously captured after the UAV 1 starts flying. A result of the attitude estimation by the first attitude estimation unit 16 (hereinafter referred to as a "first attitude estimation result") is represented by an Euler angle (including three parameters of the roll angle, the pitch angle, and the yaw angle), rotation matrices (a rotation matrix around the X-axis, a rotation matrix around the Y-axis, and a rotation matrix around the Z-axis), or a quaternion (including four parameters (x, y, z, and w) of the three rotation axes and one rotation angle) (desirably, represented by the quaternion), and the result of the attitude estimation is output to the control unit 18. Incidentally, RGB values obtained from the images are preferably used to acquire the characteristic points. Moreover, so-called bundle adjustment is preferably performed in order to reduce accumulation of errors caused in a process of tracing the characteristic points. Moreover, the first attitude estimation unit 16 may also estimate the attitude of the UAV 1 by performing the SLAM on the basis of detection values detected by an optical sensor other than the camera.

The second attitude estimation unit 17 includes: a CPU that is a processor; a ROM; a RAM; a non-volatile memory; and the like. The second attitude estimation unit 17 continuously acquires detection values from the rotation angle detection unit 15, and estimates an attitude of the UAV 1 (an attitude in the world coordinate system) on the basis of the detection values. A result of the attitude estimation by the second attitude estimation unit 17 (hereinafter referred to as a "second attitude estimation result") is represented by an Euler angle, rotation matrices, or a quaternion (desirably, represented by the quaternion), and is output to the control unit 18. For example, in a case where the rotation angle detection unit 15 includes a triaxial angular velocity sensor, the second attitude estimation unit 17 acquires detection values (angular velocities around the X-axis, angular velocities around the Y-axis, and angular velocities around the Z-axis) continuously detected by the triaxial angular velocity sensor after the UAV 1 starts flying, calculates the Euler angle including the three angles (a roll angle, a pitch angle, and a yaw angle) from the acquired detection values, and estimates the calculated Euler angle (the roll angle, the pitch angle, and the yaw angle) as an attitude of the UAV 1. Here, the roll angle is calculated on the basis of the angular velocity around the X-axis, the pitch angle is calculated on the basis of the angular velocity around the Y-axis, and the yaw angle is calculated on the basis of the angular velocity around the Z-axis. Alternatively, the second attitude estimation unit 17 may also estimate, as the attitude of the UAV 1, the rotation matrices converted by a predetermined conversion formula on the basis of the calculated Euler angle. Desirably, the second attitude estimation unit 17 may estimate, as the attitude of the UAV 1, a quaternion converted by a predetermined conversion formula on the basis of the calculated Euler angle. Incidentally, the number of dimensions of the first attitude estimation result (that is, the number of parameters) and the number of dimensions of the second attitude estimation result are desirably the same. For example, in a case where the first attitude estimation result is represented by a quaternion, the second attitude estimation result is also represented by a quaternion.

Moreover, in a case where the rotation angle detection unit 15 includes a triaxial angular velocity sensor and a triaxial acceleration sensor, the second attitude estimation unit 17 acquires: detection values (the respective angular velocities around the respective axes) continuously detected by the triaxial angular velocity sensor after the UAV 1 starts flying; and detection values (three-dimensional vectors each representing a gravitational acceleration rate) continuously detected by the triaxial acceleration sensor. Then, the second attitude estimation unit 17 calculates, by a predetermined calculation formula, the roll angle and the pitch angle from each three-dimensional vector representing a gravitational acceleration rate detected by the triaxial acceleration sensor. Moreover, the second attitude estimation unit 17 calculates an Euler angle including three angles (a roll angle, a pitch angle, and a yaw angle) from the angular velocities around the X-axis, the angular velocities around the Y-axis, and the angular velocities around the Z-axis detected by the triaxial angular velocity sensor. Then, the second attitude estimation unit 17 corrects the roll angle and the pitch angle calculated from the angular velocities around the X-axis and the angular velocities around the Y-axis while using: the roll angle and the pitch angle calculated from the three-dimensional vectors representing the gravitational acceleration rates; and a complementary filter (or Kalman filter). Consequently, a drift error in each of a roll direction and a pitch direction is canceled. Then, the second attitude estimation unit 17 estimates, as the attitude of the UAV 1, the corrected roll angle, the corrected pitch angle, and the calculated yaw angle. Alternatively, the second attitude estimation unit 17 may estimate, as the attitude of the UAV 1, the rotation matrices converted by the predetermined conversion formula on the basis of the calculated or corrected Euler angle. Desirably, the second attitude estimation unit 17 may estimate, as the attitude of the UAV 1, a quaternion converted by the predetermined conversion formula on the basis of the calculated or corrected Euler angle.

Moreover, in a case where the rotation angle detection unit 15 includes a triaxial angular velocity sensor, a triaxial acceleration sensor, and a triaxial geomagnetic sensor, the second attitude estimation unit 17 acquires detection values (respective angular velocities around the respective axes) continuously detected by the triaxial angular velocity sensor, detection values (three-dimensional vectors of the gravitational acceleration rates) continuously detected by the triaxial acceleration sensor, and detection values detected by the triaxial geomagnetic sensor (three-dimensional vectors representing the north) after the UAV 1 starts fling. Then, the second attitude estimation unit 17 calculates, by a predetermined calculation formula, the roll angle and the pitch angle from each three-dimensional vector representing a gravitational acceleration rate detected by the triaxial acceleration sensor. Moreover, the second attitude estimation unit 17 calculates an Euler angle including three angles (a roll angle, a pitch angle, and a yaw angle) from the angular velocities around the X-axis, the angular velocities around the Y-axis, and the angular velocities around the Z-axis detected by the triaxial angular velocity sensor. Then, the second attitude estimation unit 17 corrects the roll angle and the pitch angle calculated from the angular velocities around the X-axis and the angular velocities around the Y-axis while using: the roll angle and the pitch angle calculated from the three-dimensional vectors representing the gravitational acceleration rates; and a complementary filter (or Kalman filter). Furthermore, the second attitude estimation unit 17 calculates the yaw angle by the predetermined calculation formula from the three-dimensional vectors detected by the triaxial geomagnetic sensor and representing the north, and corrects the yaw angle calculated from the angular velocities around the Z-axis by using the calculated yaw angle and the complementary filter (or the Kalman filter). Consequently, an error in the yaw is canceled. Then, the second attitude estimation unit 17 estimates, as the attitude of the UAV 1, the corrected roll angle, the corrected pitch angle, and the corrected yaw angle. Alternatively, the second attitude estimation unit 17 may also estimate, as the attitude of the UAV 1, the rotation matrices converted by the predetermined conversion formula on the basis of the corrected Euler angle. Desirably, the second attitude estimation unit 17 may estimate, as the attitude of the UAV 1, a quaternion converted by the predetermined conversion formula on the basis of the corrected Euler angle.

Incidentally, the rotation angle detection unit 15 is more easily influenced by a magnetic field or the like than the imaging unit 14 or the like is, and when there is the above-described specific object near the UAV 1, a detection value may not be reliable. Due to this, under such a situation, accuracy of the attitude estimation by the second attitude estimation unit 17 (that is, accuracy of the second attitude estimation result) becomes more degraded than accuracy of the attitude estimation by the first attitude estimation unit 16 (that is, accuracy of the first attitude estimation result), and therefore, it is desirable to utilize the first attitude estimation result for the attitude estimation of the UAV 1. On the other hand, in a situation where there is no specific object near the UAV 1, the accuracy of the attitude estimation by the second attitude estimation unit 17 becomes higher than the accuracy of the attitude estimation by the first attitude estimation unit 16, and therefore, it is desirable to utilize the second attitude estimation result for the attitude estimation of the UAV 1.

The control unit 18 includes a CPU which is a processor, a ROM, a RAM, a non-volatile memory, and the like. The control unit 18 controls flight of the UAV 1 (that is, control from takeoff to landing of the UAV 1) in accordance with a control program stored in, for example, a ROM or a non-volatile memory. In the flight control, a rotor speed, a position, an attitude, and an advancing direction of the UAV 1 are controlled by using: positional information acquired from the positioning unit 12; the first attitude estimation result acquired from the first attitude estimation unit 16; the second attitude estimation result acquired from the second attitude estimation unit 17; flight plan information indicating a flight plan; and the like.

In particular, the control unit 18 controls the attitude of the UAV 1 by utilizing the first attitude estimation result acquired from the first attitude estimation unit 16 and the second attitude estimation result acquired from the second attitude estimation unit 17 at a ratio based on the positional information acquired from the positioning unit 12 (that is, positional information indicating a current position). Here, "the ratio based on the positional information" is, in other words, a ratio that can be changed in accordance with the current position of the UAV 1 in flight. Such a ratio is preferably represented by a ratio "A:B (A to B)" (A and B are values equal to 0 or more) between weight "A" having the first attitude estimation result utilized and weight "B" having the second attitude estimation result utilized (in this example, a ratio having the first attitude estimation result utilized is "A/(A+B)", and a ratio having the second attitude estimation result utilized is "B/(A+B)"). For example, in a case of "A:B=1:0", the control unit 18 controls the attitude of the UAV 1 by utilizing only the first attitude estimation result without utilizing the second attitude estimation result (that is, flight control based on the first attitude estimation result). On the other hand, in a case of "A:B=0:1", the control unit 18 controls the attitude of UAV 1 by utilizing only the second attitude estimation result without utilizing the first attitude estimation result (that is, flight control based on the second attitude estimation result). Incidentally, in a case of utilizing one of the attitude estimation results like "A:B=1:0" or "A:B=0:1", it may not be necessary to obtain attitude estimation results of both the first attitude estimation result and the second attitude estimation result. That is, in this case, only an attitude estimation result to be utilized is obtained, and it may not be necessary to calculate the other attitude estimation result that will not be utilized.

On the other hand, in a case of "A:B=1:1", the control unit 18 controls the attitude of the UAV 1 by equally utilizing the first attitude estimation result and the second attitude estimation result. Besides, a case of "A:B=1:2" or "A:B=3:1", or the like may also be considered. In a case where neither A nor B is 0, the control unit 18 may preferably utilize the first attitude estimation result and the second attitude estimation result by merging these attitude estimation results. As an exemplary method of merging the first attitude estimation result and the second attitude estimation result, it is possible to exemplify a method of combining the first attitude estimation result and the second attitude estimation result by using an a value (a blending) as indicated by formulas (1) to (4) below. The formulas (1) to (4) below are examples of combining calculation formulas for the respective parameters (x, y, z, and w) in a case of representing the attitude of the UAV 1 by a quaternion, and the formulas correspond to formulas of linear interpolation.

$$x = \alpha \times x1 + (\alpha - 1) \times x2 \quad (1)$$

$$y = \alpha \times y1 + (\alpha - 1) \times y2 \quad (2)$$

$$z = \alpha \times z1 + (\alpha - 1) \times z2 \quad (3)$$

$$w = \alpha \times w1 + (\alpha - 1) \times w2 \quad (4)$$

Here, a sign $\alpha$ is a value of 0 or more and 1 or less, and is A/(A+B). Signs x1, y1, z1, and w1 respectively indicate four parameters of a quaternion in the first attitude estimation result. Signs x2, y2, z2, and w2 respectively indicate four parameters of a quaternion in the second attitude estimation result. Signs x, y, z, and w respectively indicate four parameters of a quaternion combined by the $\alpha$ value, and are used to control the attitude of the UAV 1. Here, each of the four parameters of the quaternion may be combined by the $\alpha$ value while using a formula of spherical linear interpolation instead of the formula of linear interpolation (that is, using "since/sine" instead of a indicated in (1) to (4), and using "sin(1−α)θ/sin θ" instead of (α−1)). Consequently, a highly accurate combined result can be obtained even in a case where there is a large deviation amount between the first attitude estimation result and the second attitude estimation result. Incidentally, the first and second attitude estimation results each represented by an Euler angle or rotation matrices may also be combined by the a value while using the formula of linear interpolation as indicated in the above formulas (1) to (4).

By the way, the ratio based on the positional information of the UAV 1 is designated by a positional relation between the UAV 1 and the specific object. For example, the ratio is designated such that the shorter a distance between the UAV 1 and the specific object is, the smaller the ratio of B to A becomes. Consequently, the ratio having the first attitude estimation result utilized is increased. On the other hand, the ratio is designated such that the longer the distance between the UAV 1 and the specific object is, the larger the ratio of B to A becomes. Consequently, the ratio having the second attitude estimation result utilized is increased. Incidentally, the ratio having the first attitude estimation result utilized is preferably designated so as to be inversely proportional to square of the distance between the UAV 1 and the specific object. Thus, in the case where the distance between the UAV 1 and the specific object is used, it can be said that the ratio based on the positional information of the UAV 1 is a ratio based on the distance between the UAV 1 and the specific object.

For example, in a case where there is the specific object in the vicinity of the takeoff point (such as the port), it can be said that the ratio based on the positional information of the UAV 1 is a ratio based on a distance from the takeoff point of the UAV 1. Consequently, the first attitude estimation result and the second attitude estimation result can be utilized at a ratio that is changed in accordance with the distance from the takeoff point of the UAV 1. In this case, the control unit 18 calculates the distance from the takeoff point of the UAV 1 on the basis of the positional information of the UAV 1. For example, the distance is calculated from three-dimensional position coordinates of the takeoff point of the UAV 1 and three-dimensional position coordinates of the current position of UAV 1. Then, the control unit 18 may control the attitude of the UAV 1 by: utilizing at least the first attitude estimation result (that is, the first attitude estimation result, or the attitude estimation result obtained by merging the first attitude estimation result and the second attitude estimation result) until the UAV 1 reaches a predetermined distance (e.g., 30 m) after taking off; and utilizing the second attitude estimation result after the UAV 1 has reached the predetermined distance (that is, "A:B=0:1"). That is, switching to the flight control based on the second attitude estimation result is performed when the UAV 1 becomes distant from the specific object and located in the predetermined distance at which the second attitude estimation result is expected to be a reliable level (in other words, the distance at which control of the attitude of the UAV 1 is prevented from being disturbed). Consequently, switching to the attitude control having a small load can be performed from an early stage in which the second attitude estimation result is expected to be a reliable level.

Moreover, in a case where there is the specific object in the vicinity of the takeoff point, the higher the UAV 1 ascends, the more reduced influence of a magnetic field or the like is, and therefore, it is preferable that the ratio is designated such that the lower the altitude of the UAV 1 is, the smaller B becomes relative to A whereas the ratio is designated such that the higher the altitude of the UAV 1 is, the larger B becomes relative to A. In a case where the altitude of the UAV 1 is thus used, it can be said that the ratio based on the positional information of the UAV 1 is a ratio based on the altitude of the UAV 1. Consequently, the first attitude estimation result and the second attitude estimation result can be utilized at a ratio that is changed in accordance with a flight altitude of the UAV 1. In this case, the control unit 18 may control the attitude of the UAV 1 by: utilizing at least the first attitude estimation result until the UAV 1 reaches a predetermined altitude after taking off; and utilizing the second attitude estimation result after the UAV 1 has reached the predetermined altitude. That is, switching to the flight control based on the second attitude estimation result is performed when the UAV 1 ascends to the predetermined altitude where the second attitude estimation result is expected to be a reliable level (in other words, the altitude where the control of the attitude of the UAV 1 is prevented from being disturbed). Consequently, switching to the attitude control having a small load can be performed from an early stage in which the second attitude estimation result is expected to be a reliable level.

Moreover, the control unit 18 may control the attitude of the UAV 1 by: utilizing at least the first attitude estimation result in a case where a deviation amount between the first attitude estimation result and the second attitude estimation result is a threshold value or more; and utilizing the second attitude estimation result in a case where the deviation amount is less than the threshold value. Consequently, switching to the attitude control having a small load can be performed from an early stage in which the deviation amount between the first attitude estimation result and the second attitude estimation result is reduced to a certain level (that is, the second attitude estimation result becomes a reliable level. Incidentally, the control unit 18 calculates an integral value of deviation amounts during a predetermined time from when the deviation amount between the first attitude estimation result and the second attitude estimation result becomes less than the threshold value, and in a case where the integral value of the deviation amounts is less than a threshold value, the second attitude estimation result may be utilized. Moreover, the deviation amount can be calculated even in a case where the first attitude estimation result and the second attitude estimation result are represented by any of an Euler angle, rotation matrices, and a quaternion, however, it is possible to suppress calculation processing from becoming complex in a case of calculating the deviation amount by using the first attitude estimation result and the second attitude estimation result represented by the quaternion.

Moreover, the control unit 18 calibrates (sets) the reference azimuth of the UAV 1 to a true value (e.g., the north) before the UAV 1 takes off in accordance with, for example, a command from an operator who is present at the takeoff point, and in a case where a deviation amount between the true value and α value indicating the reference azimuth (the north) detected by the triaxial geomagnetic sensor is a threshold value or more, the control unit 18 may control the attitude of the UAV 1 by utilizing at least the first attitude estimation result, and in a case where the deviation amount is less than the threshold value, the control unit 18 may control the attitude of the UAV 1 by utilizing the second attitude estimation result. Consequently, switching to the attitude control having a small load can be performed from an early stage in which the deviation amount between the true value and the value indicating the reference azimuth is reduced to a certain level. Incidentally, the control unit 18 calculates an integral value of the deviation amounts during a predetermined time from when the deviation amount between the true value and the value indicating the reference azimuth becomes less than the threshold value, and the control unit 18 may utilize the second attitude estimation result in a case where the integral value of the deviation amounts is less than the threshold value.

Moreover, there is a case where a predetermined area (for example, an area along a power transmission line) having a strong magnetic field or the like in a wide range can be identified. In this case, the control unit 18 may control the attitude of the UAV 1 by: utilizing the first attitude estimation result when the UAV 1 is located inside the predetermined area; and utilizing the second attitude estimation result when the UAV 1 is located outside the predetermined area. Consequently, it is possible to utilize the first attitude estimation result and the second attitude estimation result in a switching manner in accordance with whether or not the UAV 1 has entered the predetermined area having the strong magnetic field or the like during the flight of the UAV 1.

Furthermore, feedback control is performed in the attitude control of the UAV 1 such that the UAV 1 keeps a normal attitude in accordance with an attitude estimation result (that is, the first attitude estimation result, the second attitude estimation result, or the attitude estimation result obtained by merging the first attitude estimation result and the second attitude estimation result) obtained at the ratio based on the positional information of the UAV 1 as described above.

[3. Operation of UAV 1]

Figure 3:
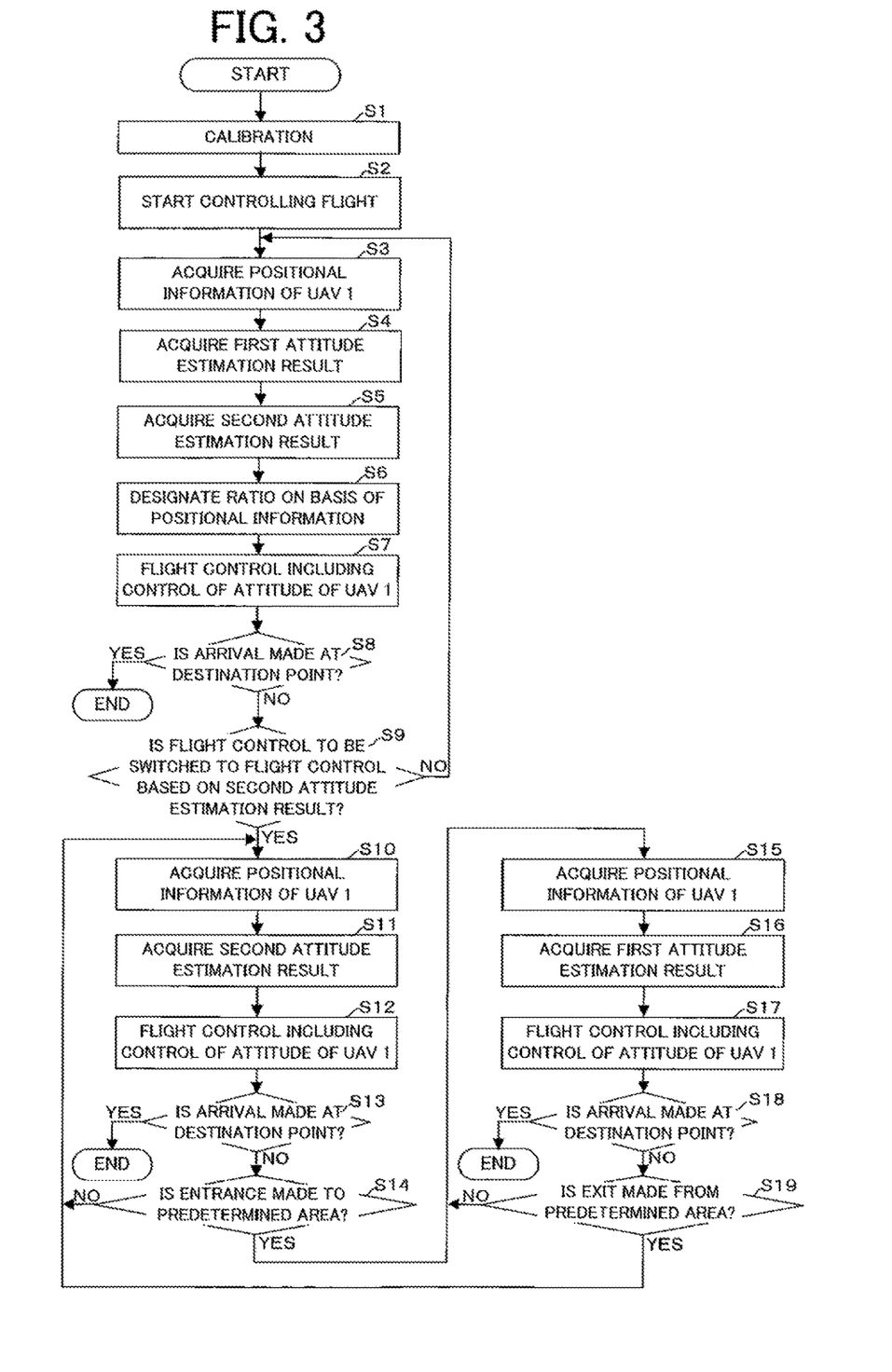
FIG. 3 is a flowchart illustrating exemplary processing executed by a control unit 18 of the UAV 1.
Figure 4:
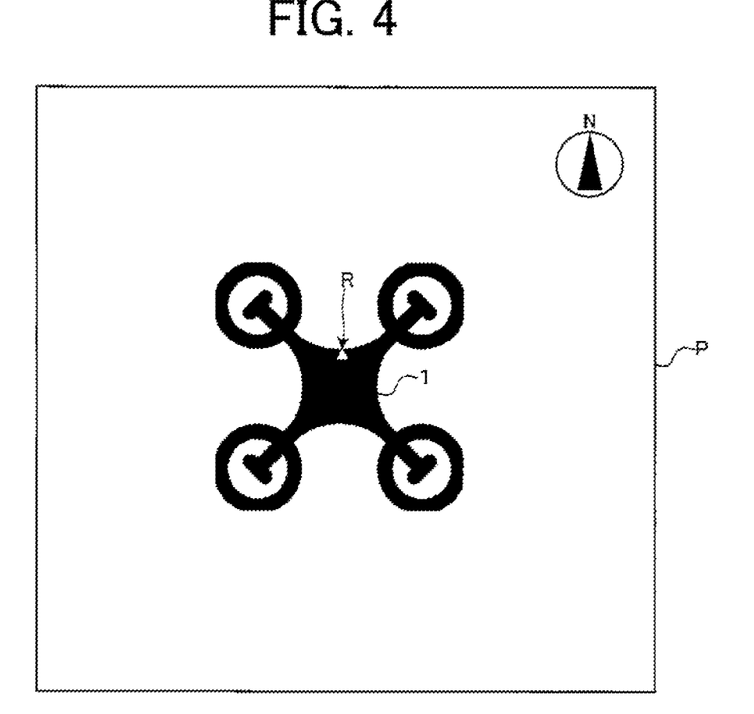
FIG. 4 is a diagram illustrating a reference azimuth of the UAV 1 set before takeoff.
Figure 5:
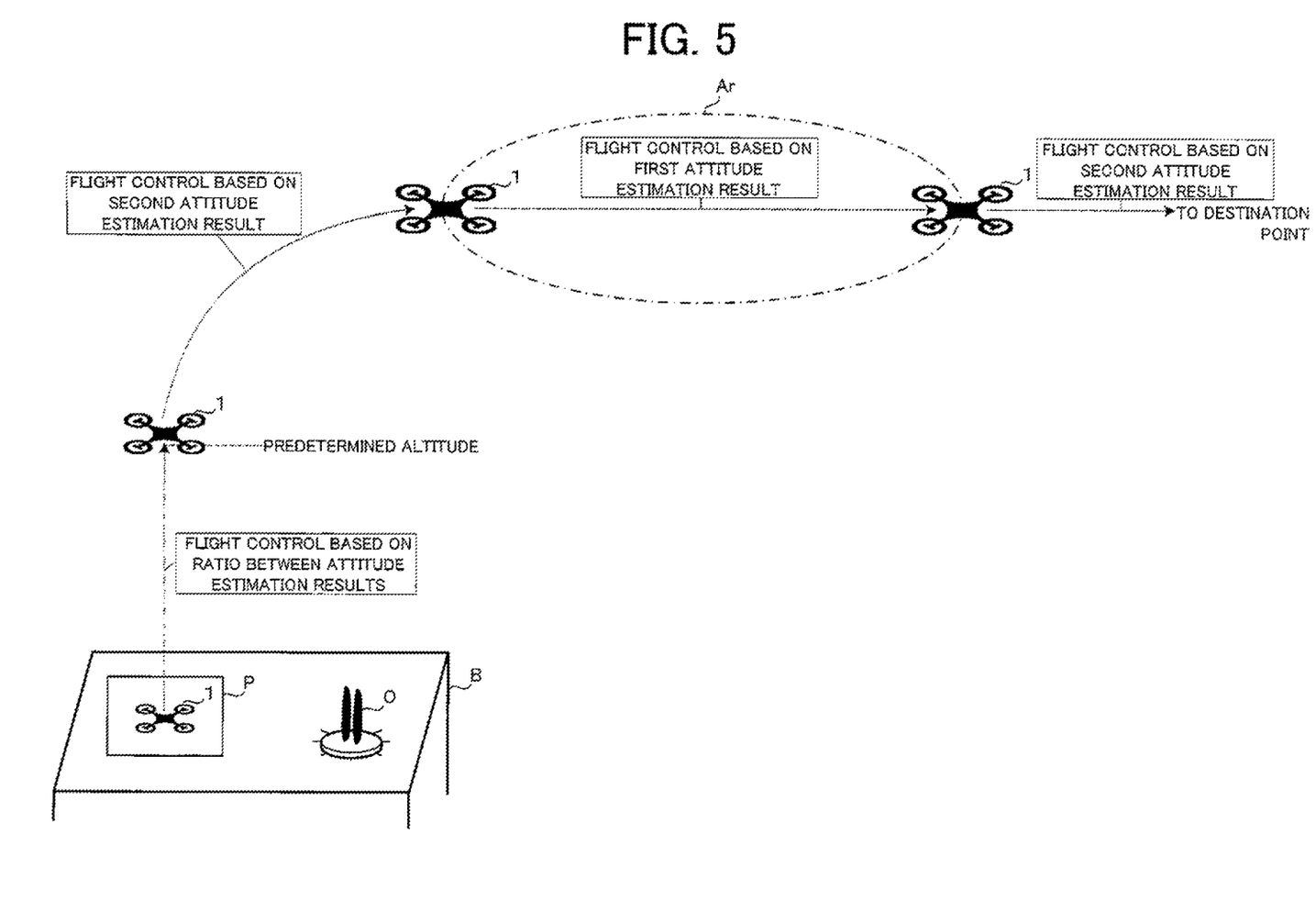
FIG. 5 is a conceptual diagram illustrating a state from when the UAV 1 takes off from a port where there is a specific object in a vicinity until the UAV 1 heads to a destination point.

Next, operation of the UAV 1 will be described with reference to FIG. 3. FIG. 3 is a flowchart illustrating exemplary processing executed by the control unit 18 of the UAV 1. Incidentally, all or part of the processing illustrated in FIG. 3 may be performed also by the control server CS. FIG. 4 is a diagram illustrating a reference azimuth of the UAV 1 set before takeoff. FIG. 5 is a conceptual diagram illustrating a state from when the UAV 1 takes off from the port where there is the specific object in the vicinity until the UAV 1 heads to the destination point. In the operation described below, a description will be provided by exemplifying a case where the UAV 1 that has acquired flight plan information from, for example, a UTMS 2 takes off from the port P (takeoff point) and heads to the destination point, in which the port P is installed on a rooftop of a building B and there is the specific object O in the vicinity as illustrated in FIG. 5. As a premise of such operation, when flight start is commanded from a piloting terminal after an operator of the UAV 1 horizontally places, on the port P, a reference point of the UAV 1 (for example, the reference point R illustrated in FIG. 4) in a manner oriented to the north (N), a flight start command is transmitted from the piloting terminal to the UAV 1. Incidentally, when the UAV 1 is powered on by the operator, power is supplied to the respective units from a battery of the UAV 1. The control unit 18 may control the power supply to the imaging unit 14 and the first attitude estimation unit 16 on the basis of positional information of the UAV 1 during the flight of the UAV 1 (ON/OFF control).

The processing illustrated in FIG. 3 is started when the flight start command is received. When the processing illustrated in FIG. 3 is started, the control unit 18 calibrates the reference azimuth of the UAV 1 to a true value (the azimuth in which the reference point of the UAV 1 is currently oriented, for example, the north) by performing the calibration (step S1) Consequently, the control unit 18 recognizes the correct north.

Next, the control unit 18 activates the respective units of the UAV 1 and starts controlling flight of the UAV 1 (step S2). Consequently, the positioning unit 12 outputs the positional information indicating a current position of the UAV 1 to the control unit 18 at a predetermined cycle. The imaging unit 14 outputs a detected detection value to the first attitude estimation unit 16 (or to the first attitude estimation unit 16 and the control unit 18) at a predetermined cycle. The first attitude estimation unit 16 estimates the attitude of the UAV 1 by performing the Visual-SLAM on the basis of the detection values from the imaging unit 14, and outputs a first attitude estimation result to the control unit 18 at a predetermined cycle. The rotation angle detection unit 15 outputs a detected detection value to the second attitude estimation unit 17 (or to the second attitude estimation unit 17 and the control unit 18) at a predetermined cycle. The second attitude estimation unit 17 estimates the attitude of the UAV 1 on the basis of the detection values from the rotation angle detection unit 15, and outputs a second attitude estimation result to the control unit 18 at a predetermined cycle.

Next, the control unit 18 acquires the positional information from the imaging unit 14 (step S3). Next, the control unit 18 acquires a first attitude estimation result from the first attitude estimation unit 16 (step S4). Next, the control unit 18 acquires a second attitude estimation result from the second attitude estimation unit 17 (step S5). Next, the control unit 18 designates a ratio on the basis of the positional information acquired in step S3 as described above (step S6). Next, the control unit 18 controls flight including control of the position, the attitude, and an advancing direction of the UAV 1 (step S7). In such flight control, the control unit 18 controls the attitude of the UAV 1 by utilizing the first attitude estimation result acquired in step S4 and the second attitude estimation result acquired in step S5 at the ratio designated in step S6 (flight control based on the ratio between the attitude estimation results).

Next, the control unit 18 determines whether or not the UAV 1 has arrived at the destination point on the basis of the flight plan information and the positional information of the UAV 1 (step S8). In a case of determining that the UAV 1 has not arrived yet at the destination point (step S8: NO), the control unit 18 proceeds to step S9. On the other hand, in a case of determining that the UAV 1 has arrived at the destination point (step S8: YES), the control unit 18 ends the processing illustrated in FIG. 3.

In step S9, the control unit 18 determines whether or not to perform switching to flight control based on the second attitude estimation result from the flight control based on the ratio between the attitude estimation results. For example, as illustrated in FIG. 5, the control unit 18 identifies, on the basis of altitude information of the UAV 1, an altitude (flight altitude) of the UAV 1 after the UAV 1 has taken off from the port P, and in a case where the identified altitude reaches a predetermined altitude, the control unit 18 determines to perform switching to the flight control based on the second attitude estimation result from the flight control based on the ratio between the attitude estimation results. Alternatively, the control unit 18 calculates a distance from the port P of the UAV 1 on the basis of the positional information of the UAV 1, and in a case where the calculated distance reaches a predetermined distance, the control unit 18 may determine to perform switching to the flight control based on the second attitude estimation result. Alternatively, the control unit 18 calculates a deviation amount between a most recently acquired first attitude estimation result and a most recently acquired second attitude estimation result, and in a case where the calculated deviation amount is less than a threshold value, the control unit 18 may determine to perform switching to the flight control based on the second attitude estimation result. Alternatively, the control unit 18 calculates the deviation amount between the true value and a value indicating the reference azimuth (north) detected by the triaxial geomagnetic sensor of the rotation angle detection unit 15, and in a case where the calculated deviation amount is less than the threshold value, the control unit 18 may determine to perform switching to the flight control based on the second attitude estimation result.

Then, in a case of determining not to perform switching to the flight control based on the second attitude estimation result (step S9: NO), the control unit 18 returns to step S3 and repeats the similar processing as described above. On the other hand, in a case of determining to perform switching to the flight control based on the second attitude estimation result (step S9: YES), the control unit 18 stops acquiring a first attitude estimation result, and proceeds to step S10. Here, the control unit 18 may turn off the power supply to the imaging unit 14 and the first attitude estimation unit 16. That is, the power supply to the imaging unit 14 and the first attitude estimation unit 16 are controlled on the basis of the positional information of the UAV 1. Consequently, power consumption in the UAV 1 can be suppressed.

In step S10, the control unit 18 acquires the positional information from the imaging unit 14. Next, the control unit 18 acquires a second attitude estimation result from the second attitude estimation unit 17 (step S11). Next, the control unit 18 controls flight including control of the position, the attitude, and the advancing direction of the UAV 1 (step S12). In such flight control, the control unit 18 controls the attitude of the UAV 1 by utilizing the second attitude estimation result acquired in step S11.

Next, the control unit 18 determines whether or not the UAV 1 has arrived at the destination point on the basis of the flight plan information and the positional information of the UAV 1 (step S13). In a case of determining that the UAV 1 has not arrived yet at the destination point (step S13: NO), the control unit 18 proceeds to step S14. On the other hand, in a case of determining that the UAV 1 has arrived at the destination point (step S13: YES), the control unit 18 ends the processing illustrated in FIG. 3.

In step S14, the control unit 18 determines, on the basis of the positional information of the UAV 1, whether or not the UAV 1 has entered a predetermined area Ar (for example, an area preliminarily registered) having a strong magnetic field or the like. In a case of determining that the UAV 1 has not entered the area Ar (step S14: NO), the control unit 18 returns to step S10 and repeats the similar processing as described above. On the other hand, in a case of determining that the UAV 1 has entered the area Ar (step S14: YES), the control unit 18 stops acquiring a second attitude estimation result and proceeds to step S15. Consequently, it is possible to perform switching to the flight control based on the first attitude estimation result from the flight control based on the second attitude estimation result as illustrated in FIG. 5.

Incidentally, in a case where the power supply to the imaging unit 14 and the first attitude estimation unit 16 is turned off in step S9, the control unit 18 turns on the power supply to the imaging unit 14 and the first attitude estimation unit 16 to activate the imaging unit 14 and the first attitude estimation unit 16 at least before moving into the area Ar (for example, a few seconds before). Consequently, it is possible to smoothly perform switching to the flight control based on the first attitude estimation result from the flight control based on the second attitude estimation result. For example, a relative relation between the second attitude estimation result and the first attitude estimation result is preliminarily acquired before the UAV 1 moves into the area Ar, thereby achieving continuation of stable flight even though the UAV 1 moves into the area Ar and the flight control is switched to the flight control based on the first attitude estimation result. Moreover, in a case where the area Ar flies many times or a plurality of UAVs 1 flies, it is expected that accuracy of attitude estimation by the first attitude estimation unit 16 will be improved by accumulating characteristic point map information of the area Ar.

In step S15, the control unit 18 acquires the positional information from the imaging unit 14. Next, the control unit 18 acquires a first attitude estimation result from the first attitude estimation unit 16 (step S16). Next, the control unit 18 controls flight including control of the position, the attitude, and the advancing direction of the UAV 1 (step S17). In such flight control, the control unit 18 controls the attitude of the UAV 1 by utilizing the first attitude estimation result acquired in step S16.

Next, the control unit 18 determines whether or not the UAV 1 has arrived at the destination point on the basis of the flight plan information and the positional information of the UAV 1 (step S18). In a case of determining that the UAV 1 has not arrived yet at the destination point (step S18: NO), the control unit 18 proceeds to step S19. On the other hand, in a case of determining that the UAV 1 has arrived at the destination point (step S18: YES), the control unit 18 ends the processing illustrated in FIG. 3.

In step S19, the control unit 18 determines whether or not the UAV 1 has made an exit from the area Ar on the basis of the positional information of the UAV 1. In a case of determining that the UAV 1 has not made the exit from the area Ar (step S19: NO), the control unit 18 returns to step S15 and repeats the similar processing as described above. On the other hand, in a case of determining that the UAV 1 has made an exit from the area Ar (step S19: YES), the control unit 18 stops acquiring a first attitude estimation result and returns to the step S10. Consequently, it is possible to perform switching to the flight control based on the second attitude estimation result from the flight control based on the first attitude estimation result as illustrated in FIG. 5.

As described above, according to the above-described embodiment, the first attitude estimation unit 16 estimates the attitude of the UAV 1 by performing the Visual-SLAM on the basis of detection values detected by the imaging unit 14, and the second attitude estimation unit 17 estimates the attitude of the UAV 1 on the basis of the detection values detected by the rotation angle detection unit 15. And then, since the control unit 18 controls the attitude of the UAV 1 by utilizing the first attitude estimation result from the first attitude estimation unit 16 and the second attitude estimation result from the second attitude estimation unit 17 at the ratio based on the positional information of the UAV 1, the UAV 1 can stably take off and the UAV 1 can be made to stably fly even in a case where a detection value detected by a geomagnetic sensor or an inertial sensor is not reliable due to a fact that there is the specific object in the vicinity of the takeoff point of the UAV 1.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above-described embodiment, the control unit 18 of the UAV 1 controls the attitude of the UAV 1 by utilizing the first attitude estimation result and the second attitude estimation result at the ratio based on the positional information of the UAV 1, but the control server CS may also control, as a control device of the present invention, the attitude of the UAV 1. In this case, the control server CS functions as the first acquisition unit, the second acquisition unit, the third acquisition unit, the first attitude estimation unit, the second attitude estimation unit, the flight control unit, and the like. Then, the control server CS acquires, from the UAV 1, a first detection value detected by the imaging unit 14, acquires a second detection value detected by the rotation angle detection unit 15 from the UAV 1, and acquires positional information indicating a current position of the UAV 1 detected by the positioning unit 12. Then, the control server CS estimates the attitude of the UAV 1 on the basis of the acquired first detection value by the first attitude estimation unit, estimates the attitude of the UAV 1 on the basis of the acquired second detection value by the second attitude estimation unit, and then controls the attitude of the UAV 1 by utilizing the first attitude estimation result by the first attitude estimation unit and the second attitude estimation result by the second attitude estimation unit at a ratio based on the acquired positional information. Such control is performed by transmitting a control command from the control server CS to the UAV 1. In the above-described embodiment, the description has been provided by exemplifying the case of applying the present invention to the UAV 1, but the present invention is also applicable to a manned aerial vehicle capable of flying without a manipulator (pilot) inside the aerial vehicle.

REFERENCE SIGNS LIST

1 UAV
2 UTMS
3 PMS
11 Drive unit
12 Positioning unit
13 Radio communication unit
14 Imaging unit
15 Rotation angle detection unit
16 First attitude estimation unit
17 Second attitude estimation unit
18 Control unit
CS Control server
S Flight system

The invention claimed is:

1. A control device that controls flight of an aerial vehicle including an optical sensor and at least one type of a triaxial sensor, the control device comprising:
at least one memory configured to store program code; and at least one processor configured to access the program code and operate as instructed by the program code, the program code including:
first acquisition code configured to cause the at least one processor to acquire a first detection value detected by the optical sensor;
second acquisition code configured to cause the at least one processor to acquire a second detection value detected by the triaxial sensor;
first attitude estimation code configured to cause the at least one processor to estimate an attitude of the aerial vehicle based on the first detection value;
second attitude estimation code configured to cause the at least one processor to estimate an attitude of the aerial vehicle based on the second detection value; and
flight control code configured to cause the at least one processor to control flight of the aerial vehicle,
wherein the flight control code causes the at least one processor to utilize at least the result of the attitude estimation by the first attitude estimation code in a case where a deviation amount between the result of the attitude estimation by the first attitude estimation code and the result of the attitude estimation by the second attitude estimation code is a threshold value or more, and the flight control code causes the at least one processor to utilize the result of the attitude estimation by the second attitude estimation code in a case where the deviation amount is less than the threshold value.

2. The control device according to claim 1, the program code further including distance calculation code configured to cause the at least one processor to calculate a distance from a takeoff point of the aerial vehicle on the basis of positional information, wherein the flight control code causes the at least one processor to utilize the result of the attitude estimation by the first attitude estimation code and the result of the attitude estimation by the second attitude estimation code at a ratio based on the distance.

3. The control device according to claim 2, wherein the flight control code causes the at least one processor to utilize at least the result of the attitude estimation by the first attitude estimation code until the aerial vehicle reaches a predetermined distance after taking off, and the flight control code causes the at least one processor to utilize the result of the attitude estimation by the second attitude estimation code after the aerial vehicle has reached the predetermined distance.

4. The control device according to claim 1, wherein the flight control code causes the at least one processor to utilize the result of the attitude estimation by the first attitude estimation code when the aerial vehicle is located inside a predetermined area, and the flight control code causes the at least one processor to utilizes the result of the attitude estimation by the second attitude estimation code when the aerial vehicle is located outside the predetermined area.

5. A control device that controls flight of an aerial vehicle including an optical sensor and at least one type of a triaxial sensor, the control device comprising:
   at least one memory configured to store program code; and at least one processor configured to access the program code and operate as instructed by the program code, the program code including:
   first acquisition code configured to cause the at least one processor to acquire a first detection value detected by the optical sensor;
   second acquisition code configured to cause the at least one processor to acquire a second detection value detected by the triaxial sensor;
   first attitude estimation code configured to cause the at least one processor to estimate an attitude of the aerial vehicle based on the first detection value;
   second attitude estimation code configured to cause the at least one processor to estimate an attitude of the aerial vehicle based on the second detection value; and
   flight control code configured to cause the at least one processor to control flight of the aerial vehicle,
   wherein the triaxial sensor includes a geomagnetic sensor,
   wherein the program code further comprises calibration code configured to cause the at least one processor to calibrate a reference azimuth to a true value before takeoff of the aerial vehicle, and
   wherein the flight control code causes the at least one processor to utilize at least the result of the attitude estimation by the first attitude estimation code in a case where a deviation amount between the true value and a value indicating the reference azimuth detected by the geomagnetic sensor is a threshold value or more, and the flight control code causes the at least one processor to utilize the result of the attitude estimation by the second attitude estimation code in a case where the deviation amount is less than the threshold value.

* * * * *